May 3, 1927.
A. SCHNITZLER
SHIFTING JACK FOR MOTOR VEHICLES
Filed March 4, 1926    2 Sheets-Sheet 1
1,626,630
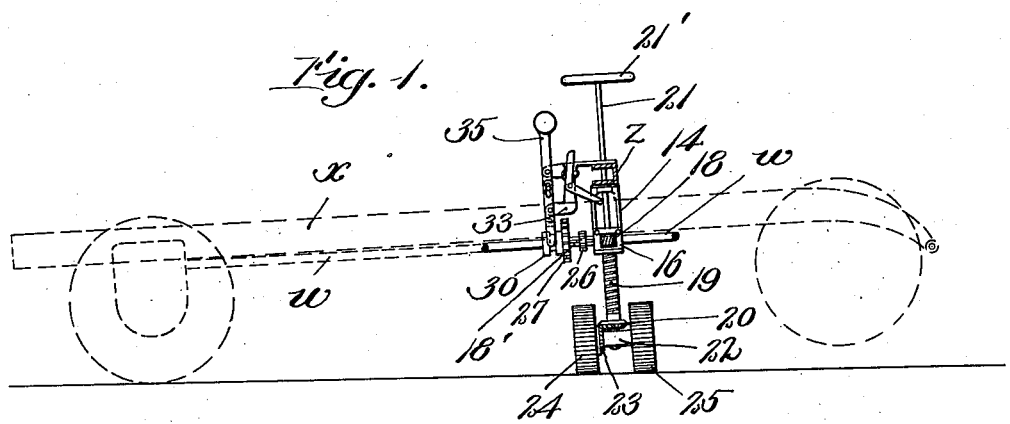
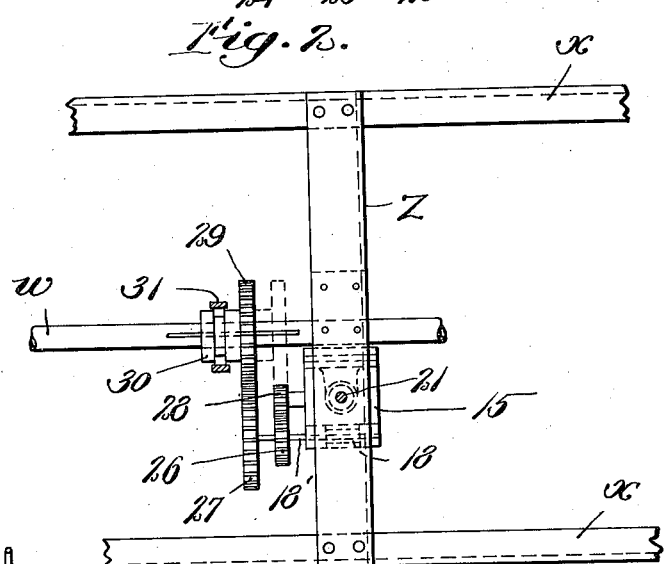
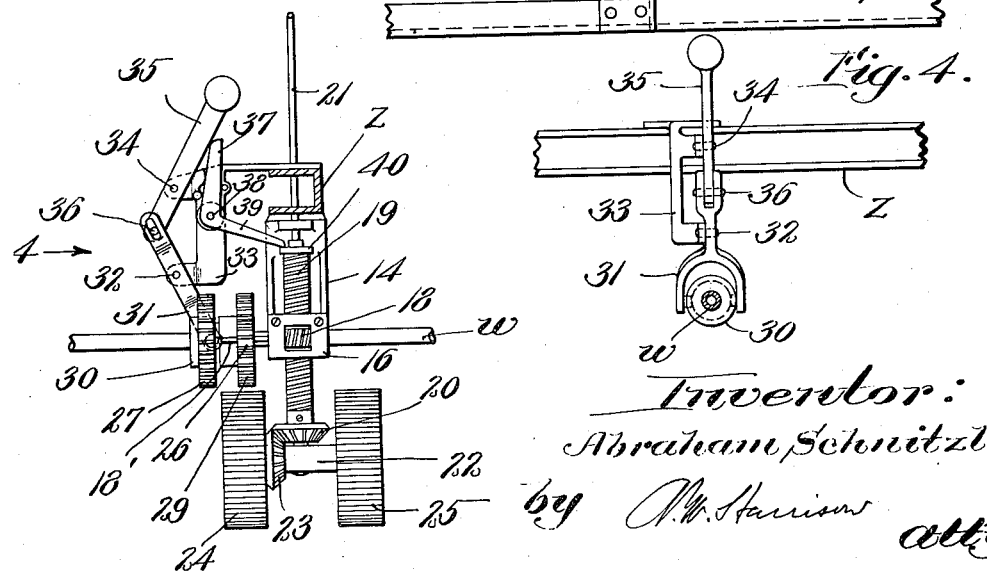
Inventor:
Abraham Schnitzler
by R. W. Harrison
atty.

May 3, 1927.
A. SCHNITZLER
1,626,630
SHIFTING JACK FOR MOTOR VEHICLES
Filed March 4, 1926  2 Sheets-Sheet 2
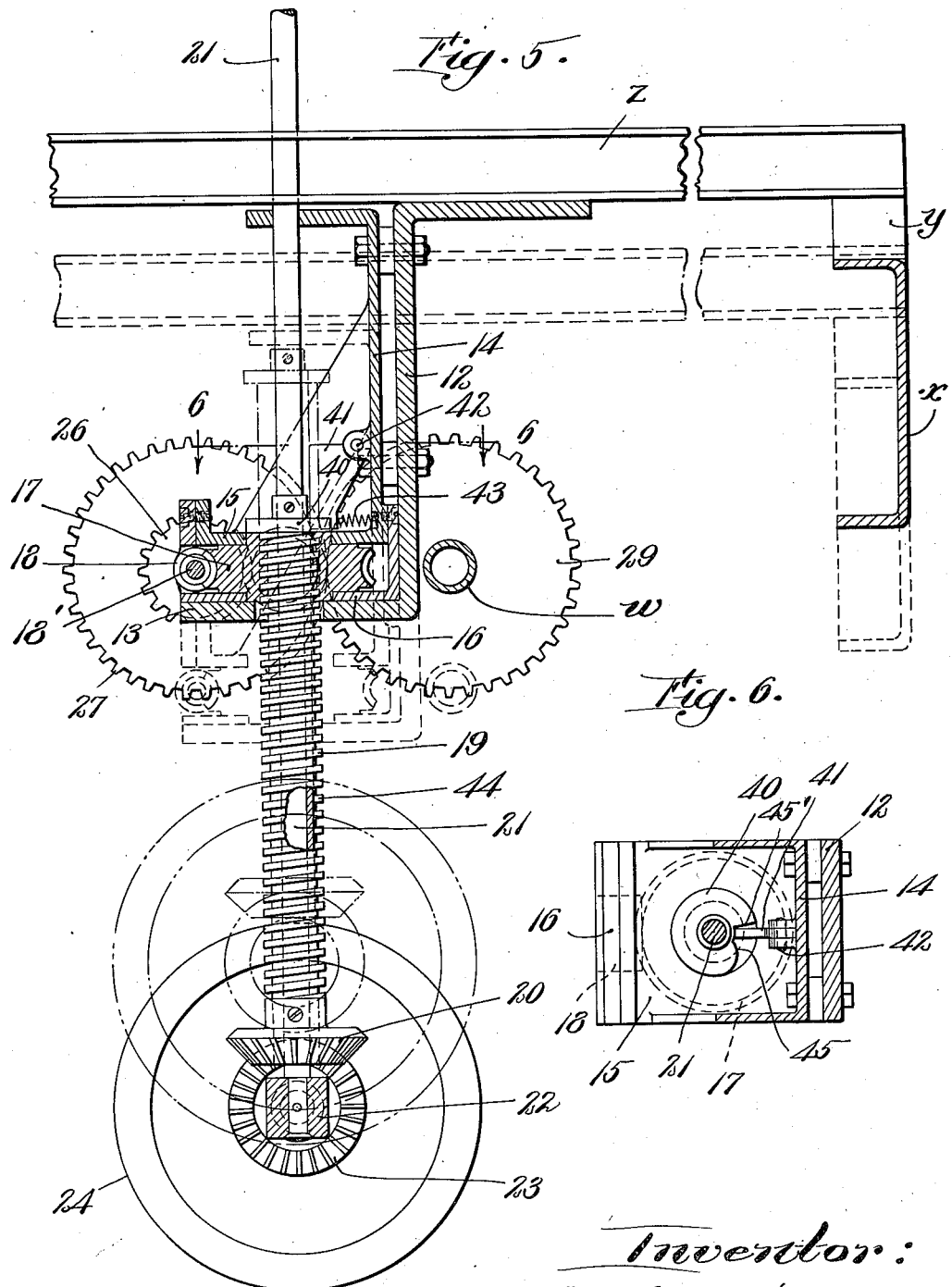

Patented May 3, 1927.

1,626,630

UNITED STATES PATENT OFFICE.

ABRAHAM SCHNITZLER, OF CHELSEA, MASSACHUSETTS.

SHIFTING JACK FOR MOTOR VEHICLES.

Application filed March 4, 1926. Serial No. 92,172.

This invention relates to means for laterally moving the front or rear of a motor vehicle when said vehicle is obstructed in front and at the rear, to facilitate the departure of the machine from a row of closely parked vehicles.

One of the objects of the invention is to provide a jacking attachment for a motor truck or other vehicle, which will enable one end of the machine having such attachment to be swung laterally either way, and to any extent, for any purpose, so that the machine will be headed in a new direction without having to move back and forth to attain such new direction.

Another object is to provide means for this purpose which is operated directly from the engine shaft without alteration in the structure of the latter.

Another object is to provide an attachment of the character mentioned, which attachment is simple and effective and of low cost both in structure and operation.

With said objects in view, the invention consists in the construction and combination substantially as hereinafter described and claimed.

Of the accompanying drawings:—

Figure 1 is a side elevation, including a dotted line indication of parts of a motor vehicle, and indicating the device as in use.

Figure 2 is a sectional plan view on a larger scale and showing parts of the chassis of the vehicle in full lines.

Figure 3 is a view similar to Figure 1, on a larger scale and showing another position of the parts of the device.

Figure 4 is a detail view looking in the direction of the arrow 4, Figure 3.

Figure 5 is a vertical sectional view on a still larger scale with dotted line indications of adjustments.

Figure 6 represents a section on line 6—6 of Figure 5.

Similar reference characters indicate similar parts in all of the figures.

A portion of the engine or motor shaft is indicated at $w$, and side bars or members of the chassis of the vehicle are illustrated at $x$. Supported by suitable spacing blocks $y$, mounted on the side bars $x$, is a cross piece $z$.

Secured to and depending from the cross piece $z$, near the middle of the length of the latter, is a bracket 12 (Fig. 5) having a horizontal flange 13. Secured to the bracket 12 is a casting or plate 14 carrying at its lower end a horizontal plate 15 and another horizontal plate 16, the latter being supported on the flange 13 of the bracket 12.

A worm wheel 17 is mounted between the plates 15, 16. Sometimes it may be desirable to provide ball bearings between the upper and lower faces of the worm wheel and the plates adjacent thereto, it being unnecessary however to illustrate the same.

The worm wheel 17 is engaged and actuated by a worm 18 the shaft 18' of which is mounted in suitable bearings carried by the housing for the worm wheel, and said worm wheel is axially threaded for the vertical tubular screw 19 which has a bevel pinion 20 at its lower end.

Extending through the screw 19 and rotatable therein is a rod 21 having a handle 21' at its upper end (Fig. 1) and an axle 22 secured to its lower end (Figs. 3 and 4), said axle having a bevel pinion 23 and a wheel 24 rotatable on one end of it, said pinion and wheel being connected to act as one, and having a wheel 25 rotatable on the other end of it. As hereinafter explained, the handle 21' enables the operator to so turn the jacking mechanism that it, alone, can be employed to not only swing the vehicle to the right or left but also to move it forward or back; and any variation in such shifting or steering can be effected without handling or operating any member of the mechanism other than said handle.

In Figures 1 and 3, both of the wheels 24 and 25 are illustrated as peripherally ribbed, but this is important only for the wheel 24, since the other wheel 25 is idly mounted at the end of the axle, the wheel 24 being driven owing to its pinion 23 meshing with the pinion 20 of the screw 19.

The worm shaft 18' carries a small pinion 26 and a larger pinion 27. The smaller pinion 26 is in constant mesh with a pinion 28 loosely mounted on a short stud axle projecting from one side of the housing for the worm wheel.

A gear 29, having its hub 30 splined on the engine shaft $w$, is shiftable along said shaft by means of a yoke lever 31 pivoted at 32 to a bracket 33 supported by the cross piece $z$ (Fig. 3), such shifting being to cause the gear 29 to mesh with either the pinion 27 or 28 as indicated, respectively, by the full and dotted lines, Figure 3.

Pivoted at 34 to the bracket 33 is a hand lever 35 the lower end of which has a pin and slot connection 36 with the upper end of the shifting lever 31. An elbow lever comprises an arm 37, pivoted at 38 to the bracket 33 and having an arm 39, the upper arm 37 being in position to contact with the lever 35 at certain times as hereinafter explained, and the lower arm 39 extending to a point to bear on a collar or enlarged upper end of the screw 19, indicated at 40.

A locking key 41 (Fig. 5) is pivoted to the plate 14 at 42 and is pressed toward the screw 19 by a suitable spring 43. The thread of the screw is interrupted by a keyway 44 extending substantially the entire length of the screw, to cooperate with the key as hereinafter described.

The collar 40 (Figure 6) is recessed in one side, one side of the recess being curved, as at 45, to present what may be termed a cam face, and the other side of the recess being radial as at 45'.

The operation of the mechanism is as follows:—

When the vehicle is travelling along the roadway, or is standing anywhere unobstructed, the jack is in inoperative position, with the wheels 24, 25, at such position of elevation that they will be above the level of the road as indicated by dotted lines in Figure 5, said figure also indicating by dotted lines the normal distance of the chassis relative to the road. The said wheels 24, 25, will not then come in contact with any unevenness of the road. When the jack is in this normal position, with the vehicle in condition for usual operation, the shifting lever 35 is in neutral position with the gear 29 out of mesh with either of the pinions or gear 27 or 28.

When the jack is to be employed to effect lateral movement of that end of the vehicle near which it is located, the lever 35 is actuated to cause the yoke lever 31 to shift the gear 29 into mesh with the gear 27. Since the gear 29 is constantly rotatable by the engine shaft, owing to its splined connection therewith, the starting of the engine then will cause the gear 29 to rotate the gear 27 which is fast on the shaft 18' of the worm 18. The latter then rotates the worm wheel 17, driving the screw 19 downward and causing the wheels 24, 25, to first reach the ground and then, by the continued operation of said parts, effecting the raising of the chassis so that the parts will occupy substantially the relative positions indicated by the full lines, Figure 5. During the operation just described the engagement of the key 41 in the keyway 44 of the screw 19 prevents the said screw from turning, but when the limit of downward movement is reached, and the collar 40 contacts with the top of the worm wheel 17, the upper end of the keyway 44 leaves the lower end or tip of the pivoted key 41, and the screw 19 is free to be rotated so that the bevel pinion 20 at the lower end of said screw will then act through the bevel pinion 23 to drive the wheel 24. The axle 22 can then be turned, by means of the rod 21 and its handle or hand wheel 21', so that the power of the engine can be employed to shift the vehicle in any direction, according to the angle or position to which the axle 22 is turned. In other words, while the wheel 24 is being driven by the engine, the rod 21 can be turned in any direction so that the shifting movement caused by the wheel 24 on the ground can be made to swing the vehicle either to the right or left, or even to work the vehicle forward or back, and the handle 21' will indicate teh direction in which the shifting is being, or is to be, effected. The amount of shifting movement can be arrested instantly by operating the hand lever 35 to disconnect the gear 39 from the rest of the gearing.

Owing to the fact that the device can be utilized to effect shifting of the vehicle in any direction, it can be employed as a "booster" when obstacles or ruts in snow or other material cause the drive wheels of the vehicle to slip, thereby avoiding the delays caused by stalling of the vehicle.

To return the jack to its normal, inoperative, position, it is only necessary to shift the gear 29 to position to mesh with the small gear 28 as indicated by dotted lines in Figure 2. The gear 28 is then intermediate between the large gear 29 and the small gear 26 carried by the shaft 18' of the worm 18, and the result is to drive the said worm in the reverse direction, and at a much higher speed than was effected when the chassis was being raised. Practically at the beginning of this reverse motion of the worm 18 and the consequent reverse motion of the screw 19, the radial wall 45' of the notch at the top of the screw comes into contact with the locking pawl or key 41 which thereby automatically prevents further rotation of the screw 19 and actuation of the shifting wheel 24. Continued rotation of the worm wheel 17 however, in the same direction, causes said worm wheel to run down along the screw until the wheels of the vehicle reach the ground, and after that to cause the screw to move upward until the shifting wheels have left the ground and resumed normal inoperative position as indicated by the dotted lines in Figure 5. When this position is reached, the collar 40 or enlargement at the upper end of the screw comes into contact with the arm 39 (Fig. 3) of the lever which is pivoted at 38, and causes the other arm 37 of said lever to act on the upper member of the compound lever 35, 31, straighten out said compound lever (see Fig. 1) and shift the gear 29 out of mesh with either of the gears 27, 26, thus automatically leaving the jack in normal position.

It is to be understood that the operating mechanism described need not be located at the particular portion of the vehicle indicated by the dotted lines in Figure 1. It may be mounted farther forward or back. If near enough to the rear wheels, the jack can be employed to enable the vehicle to move backward instead of forward out of a line of parked machines.

I do not limit myself to the use of but a single driven wheel to effect the lateral shifting. In other words, while the structure illustrated provides for positively rotating only the wheel 24, it is obvious that the shaft which carries the wheel 24 and the bevel gear 23 may extend the entire length of the axle 22 and also carry the wheel 25.

Nor do I limit myself to the specific details of the mounting of the essential parts of the jack. Changes and alterations may be resorted to in the form and arrangement of the several parts illustrated without departing from the spirit and scope of my invention as defined in the accompanying claims.

Having now described my invention, I claim:—

1. A lifting and shifting jack for motor vehicles, said jack having a ground-bearing wheel, means for lowering and raising said wheel, means for positively rotating said wheel, and means for turning the wheel to any point in a complete circular substantially horizontal plane to enable it to effect shifting of the vehicle in any direction.

2. A lifting and shifting jack for motor vehicles, said jack having a ground-bearing wheel, means for varying the vertical position of said wheel relatively to the vehicle, connections for positively rotating the wheel from the engine shaft of the vehicle, and means for turning the wheel to any point in a complete circular substantially horizontal plane to enable it to effect shifting of the vehicle in any direction.

3. The combination with a motor vehicle, of a rotatable and vertically movable screw, a gearing member engaging the threads of the screw, means for actuating said gearing member, a ground-bearing wheel having gearing connections to effect its rotation by the screw, and means for turning the ground-bearing wheel to vary its plane of rotation relatively to the vehicle.

4. The combination with the chassis of a motor vehicle, of a shifting jack secured thereto, said jack having a vertical tubular screw, a rod extending through the screw and having means for rotating it and having a transverse member at its lower end, a wheel rotatable on said member and having geared connections with the lower end of the screw, a rotatable member having threaded connection with the screw, and means for actuating said rotatable member to cause it to move the screw vertically.

5. The combination with the chassis of a motor vehicle, of a shifting jack secured thereto, said jack having a vertical tubular screw provided with an external keyway, a rod extending through the screw and having means for rotating it and having a transverse member at its lower end, a wheel rotatable on said member and having geared connections with the lower end of the screw, a rotatable member having threaded connection with the screw, means for actuating said rotatable member to cause it to move the screw vertically, and a key cooperating with the keyway of the screw to prevent rotation of the screw except when the screw is in its lower position.

6. The combination with the chassis of a motor vehicle, of a shifting jack secured thereto, said jack having a vertical tubular screw, a rod extending through the screw and having means for rotating it and having a transverse member at its lower end, a wheel rotatable on said member and having geared connections with the lower end of the screw, a worm wheel having threaded connection with the screw, a worm for actuating said worm wheel, and gearing connections with the engine shaft of the vehicle for actuating said worm.

7. The combination with a motor vehicle, of a jack for lifting one end of the vehicle and shifting it laterally, said jack having a ground-bearing wheel, means for varying the vertical position of said wheel relatively to the vehicle, gearing connections for positively driving said wheel from the engine shaft of the vehicle, means for turning the wheel to any point in a complete circular substantially horizontal plane to enable it to effect shifting of the vehicle in any direction, and means for automatically disconnecting said gearing connections when said wheel is moved to its upper position clear of the ground.

In testimony whereof I have affixed my signature.

ABRAHAM SCHNITZLER.